(12) United States Patent
Hirayama et al.

(10) Patent No.: US 12,410,307 B2
(45) Date of Patent: Sep. 9, 2025

(54) NBR COMPOSITION

(71) Applicant: NOK Corporation, Tokyo (JP)

(72) Inventors: Michiyo Hirayama, Kumamoto (JP); Hideto Komurasaki, Kumamoto (JP); Keisuke Takahashi, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 106 days.

(21) Appl. No.: 17/928,071

(22) PCT Filed: May 11, 2021

(86) PCT No.: PCT/JP2021/017886
§ 371 (c)(1),
(2) Date: Nov. 28, 2022

(87) PCT Pub. No.: WO2021/241206
PCT Pub. Date: Dec. 2, 2021

(65) Prior Publication Data
US 2023/0203283 A1    Jun. 29, 2023

(30) Foreign Application Priority Data

May 29, 2020   (JP) ................................ 2020-094803

(51) Int. Cl.
| | |
|---|---|
| *C08L 9/02* | (2006.01) |
| *C08K 3/014* | (2018.01) |
| *C08K 3/22* | (2006.01) |
| *C08K 3/30* | (2006.01) |
| *C08K 5/01* | (2006.01) |
| *C08K 5/09* | (2006.01) |

(52) U.S. Cl.
CPC .............. *C08L 9/02* (2013.01); *C08K 3/014* (2018.01); *C08K 3/22* (2013.01); *C08K 3/30* (2013.01); *C08K 5/01* (2013.01); *C08K 5/09* (2013.01); *C08K 2003/2296* (2013.01)

(58) Field of Classification Search
CPC ....................................................... C08L 9/02
See application file for complete search history.

(56) References Cited

U.S. PATENT DOCUMENTS

| 4,374,952 A | 2/1983 | Shedd et al. | |
|---|---|---|---|
| 5,523,154 A * | 6/1996 | Okamura | C08L 21/02 |
| | | | 428/407 |
| 2006/0189736 A1* | 8/2006 | Mori | C08G 18/4837 |
| | | | 524/404 |
| 2012/0225231 A1* | 9/2012 | York | C07F 7/1804 |
| | | | 524/451 |

FOREIGN PATENT DOCUMENTS

| CN | 104817739 | 8/2015 |
|---|---|---|
| CN | 107474339 | 12/2017 |
| CN | 109134975 | 1/2019 |
| CN | 110483858 | 11/2019 |
| EP | 2 610 297 | 7/2013 |
| JP | 57-40544 | 3/1982 |
| JP | 2000-95899 | 4/2000 |
| JP | 2009-256674 | 11/2009 |
| JP | 2013-133435 | 7/2013 |
| JP | 2013-142147 | 7/2013 |
| WO | 2015/005080 | 1/2015 |
| WO | 2019/124462 | 6/2019 |

OTHER PUBLICATIONS

JP 2013-133435, machine translation (Year: 2013).*
Ariga, "Petroleum Waxes for Antiozonaut", Nippon Gomu Kyokaishi, 2018, pp. 460-464, and partial English language translation.
International Search Report issued in International Patent Application No. PCT/JP2021/017886, dated Jul. 20, 2021.
International Preliminary Report on Patentability issued in International Patent Application No. PCT/JP2021/017886, dated Jul. 20, 2021 and English language translation thereof.
Extended European Search Report issued in EP Application No. 21813048.2, dated May 27, 2024.
Application of rubber protective wax in NR/BR, Huang Hongbo, Chinese Master's Theses Full-text Database, Engineering Science and Technology I, No. 02, p. B016-471, Apr. 2016.

* cited by examiner

*Primary Examiner* — William D Young
(74) *Attorney, Agent, or Firm* — GREENBLUM & BERNSTEIN, P.L.C.

(57) ABSTRACT

An NBR composition that includes, based on 100 parts by weight of NBR, 0.2 to 0.7 parts by weight, preferably 0.2 to 0.5 parts by weight, of stearic acid, and paraffin wax, which has the melting start temperature of 65° C., in an amount equal to 2 to 6 times the amount of said stearic acid, and preferably further zinc oxide and a UV resistant antioxidant. The NBR composition has improved ozone resistance using stearic acid and paraffin wax, which are generally compounded in NBR compositions, while neither affecting the material physical properties or product appearance, nor increasing the compounding amount of an ozone resistant antioxidant.

4 Claims, No Drawings

NBR COMPOSITION

TECHNICAL FIELD

The present invention relates an NBR composition. More particularly, the present invention relates to an NBR composition with improved ozone resistance.

BACKGROUND ART

NBR is widely used in automobile parts, general industrial parts, and the like as inexpensive rubber with excellent mechanical properties, oil resistance, etc. NBR has double bonds in its polymer structure, which are known as the starting point of the crosslinking reaction.

On the other hand, NBR has poor weather resistance, particularly ozone resistance. In order to improve the ozone resistance, an ozone resistant antioxidant and paraffin have conventionally been compounded.

However, the compounding of an ozone resistant antioxidant largely affects the physical aspect, and the use thereof with an increasing amount significantly deteriorates the compression set characteristics. Further, the compounding of paraffin wax leads to defects in the product appearance due to its deposition on the surface of the product.

PRIOR ART DOCUMENTS

Patent Documents

Patent Document 1: WO 2015/005080 A1

Problem to be Solved by the Invention

An object of the present invention is to provide an NBR composition that has improved ozone resistance using stearic acid and paraffin wax, which are generally compounded in NBR compositions, while neither affecting the material physical properties or product appearance, nor increasing the compounding amount of an ozone resistant antioxidant.

Means for Solving the Problem

The above object of the present invention can be achieved by an NBR composition comprising, based on 100 parts by weight of NBR, 0.2 to 0.7 parts by weight of stearic acid, and paraffin wax, which has the melting start temperature of 65° C., in an amount equal to 2 to 6 times the amount of said stearic acid.

Effect of the Invention

When an NBR composition is vulcanized and molded, paraffin wax, which shows a barrier effect on ozone, and zinc stearate, which does not show a barrier effect on ozone and is derived from zinc oxide as an acid acceptor, are deposited on the surface of the product at the same time.

According to the NBR composition of the present invention, the amount of paraffin wax deposited is increased and the ozone resistance is improved by optimizing the compounding amount of stearic acid and the compounding amount of specific paraffin wax.

Stearic acid is a chemical that affects the crosslinking reaction of NBR. In a system free of stearic acid, the vulcanization reaction is less likely to proceed, which affects high speed vulcanization and crosslinking density of the product. The compounding of an optimal amount of stearic acid improves not only the vulcanization speed, but also the compression set characteristics and product appearance.

Increase in the amount of general paraffin wax is also effective for the improvement of ozone resistance; however, it was found that only paraffin wax having a specific melting start temperature was effective, even without increasing the amount of an ozone resistant antioxidant. Further, the compounding amount thereof is limited to an amount equal to 2 to 6 times the amount of stearic acid used.

By compounding a specific amount of such specific paraffin wax, the amount of zinc stearate deposited on the surface of the rubber product is adjusted, and the amount of paraffin wax deposited is increased to improve the ozone resistance.

EMBODIMENTS FOR CARRYING OUT THE INVENTION

NBR is not limited by the content of acrylonitrile [AN] bound thereto, and those with any AN content can be used.

The amount of stearic acid compounded in NBR is 0.2 to 0.7 parts by weight, preferably 0.2 to 0.5 parts by weight, based on 100 parts by weight of NBR. If the compounding ratio is less than the above range, not only the vulcanization speed is delayed and the compression set characteristics are deteriorated, but also the ozone resistance and product appearance may be deteriorated. In contrast, if the ratio of stearic acid is greater than the above range, the product appearance is impaired, for example, cloudiness occurring.

As the paraffin wax, one having a melting start temperature (according to JIS K2235, 5.3.2 corresponding to ISO 6244, the temperature at which when a molten sample is adhered to the mercury sphere part of a thermometer for measuring the melting point and is solidified and the sample is heated under specified conditions, the first drop falls from the thermometer) of 65° C. is selected and used. If paraffin wax having a melting start temperature other than the above is used, the improvement of ozone resistance cannot be achieved.

The amount of the paraffin wax, which has the melting start temperature of 65° C. (64.5 to 65.4° C.), is limited to an amount equal to 2 to 6 times the amount of stearic acid used. If the ratio is less than the above range, the ozone resistance becomes insufficient. In contrast, if the paraffin wax is used at a ratio greater than the above range, the product appearance is deteriorated.

Example 1 of Patent Document 1 shows an example in which 1 part by weight of stearic acid and 2 parts by weight of wax (melting start temperature: 65° C.) are used based on 100 parts by weight of NBR; however, as described in Comparative Example 14 provided later, the product appearance is impaired when the amount of stearic acid used is 1 part by weight.

In addition to the above essential components, it is preferable to compound an acid acceptor, a UV resistant antioxidant, a sulfur-based vulcanizing agent, and the like.

As the acid acceptor, an oxide or hydroxide of a divalent metal, a hydrotalcite compound, or the like is used, and zinc oxide is preferably used. The compounding ratio thereof is about 1 to 20 parts by weight, preferably about 3 to 10 parts by weight, based on 100 parts by weight of NBR.

Examples of the UV resistant antioxidant having ozone resistance include amine-ketone-based, aromatic secondary amine-based, dithiocarbamate-based and thiourea-based antioxidants, special wax, and the like. Commercially available products, such as Nocrac 6C, Nocrac 224, Nocrac AW, Nocrac 810-NA, Nocrac G-1, Nocrac NBC-P, Nocrac NS-10-N, Nocrac TBTU, Sunnoc and Ozonoc (all produced by Ouchi Shinko Chemical Industrial Co., Ltd.), are used as they are singly or in combination of any two or more.

One of these UV resistant antioxidants is used at a ratio of about 0.2 to 5 parts by weight, preferably about 0.5 to 3 parts by weight, based on 100 parts by weight of NBR. According to the present invention, excellent ultraviolet light resistance (ozone resistance) is exhibited, even without particularly increasing the use ratio thereof. When two or more UV resistant antioxidants are used, they are used in a total amount of about 0.2 to 5 parts by weight, preferably about 0.5 to 4.5 parts by weight, based on 100 parts by weight of NBR.

Further, as the sulfur-based vulcanizing agent, powder sulfur, sublimed sulfur, precipitated sulfur, colloidal sulfur, surface treated sulfur, insoluble sulfur, polymer sulfur, or the like is used at a ratio of about 0.3 to 5 parts by weight, preferably about 0.5 to 2 parts by weight, based on 100 parts by weight of NBR.

Together with sulfur, guanidine-based, aldehyde-amine-based, aldehyde-ammonia-based, thiazole-based, sulfenamide-based, thiourea-based, thiuram-based, dithiocarbamate-based, and xanthate-based sulfur-containing vulcanization accelerators are used singly or in combination of any two or more, and a thiazole-based or thiuram-based vulcanization accelerator is preferably used.

Preferably examples of the vulcanization accelerator include thiazole-based vulcanization accelerators, such as di-2-benzothiazyldisulfide, N-cyclohexyl-2-benzothiazylsulfenamide, 2-mercaptobenzothiazole, zinc salt or cyclohexylamine salt of 2-mercaptobenzothiazole, 2-(N,N'-diethylthiocarbamoylthio)benzothiazole, and 2-(4'-morpholinodithio)benzothiazole; and thiuram-based vulcanization accelerators, such as tetramethylthiuram monosulfide, tetramethylthiuram disulfide, tetraethylthiuram disulfide, tetrabutylthiuram disulfide, tetrakis(2-ethylhexyl)thiuram disulfide, and dipentamethylenethiuram tetrasulfide. In general, N-cyclohexyl-2-benzothiazylsulfenamide and tetraalkylthiuram monosulfide are used.

One of these sulfur-containing vulcanization accelerators is used at a ratio of about 0.5 to 6 parts by weight, preferably about 1 to 3 parts by weight, based on 100 parts by weight of NBR. When two or more sulfur-containing vulcanization accelerators are used, they are used in a total amount of about 0.5 to 6 parts by weight, preferably about 1 to 5 parts by weight, based on 100 parts by weight of NBR.

The composition is prepared by adding, in addition to each of the above components, a filler or reinforcing agent such as carbon black or silica, a plasticizer, and other necessary components, and kneading the resulting mixture with a kneader and an open roll in sequence, followed by heating at about 170 to 190° C. for about 3 to 10 minutes, and further followed by, if necessary, oven vulcanization (secondary vulcanization) by heating at about 140 to 160° C. for about 0.5 to 10 hours.

EXAMPLES

The following describes the present invention with reference to Examples.

Example 1

NBR DN101L (produced by Zeon Corporation; 100 parts by weight bound AN content: 41.5 to 43.5%,
Mooney viscosity $ML_{1+4}$(100° C.): 53 to 67)

Carbon black (HTC #SS, produced by Nippon Steel 35 parts by weight Chemical Carbon Co., Ltd., a turbostratic graphite structure)

Zinc oxide (Zinc Oxide #1, produced by 5 parts by weight Seido Chemical Industry Co., Ltd.)

Antioxidant (Nocrac 6C, produced by 3 parts by weight Ouchi Shinko Chemical Industrial Co., Ltd.;

Antioxidant (Nocrac 224, produced by 1.5 parts by weight Ouchi Shinko Chemical Industrial Co., Ltd.;

Plasticizer (ADK Cizer RS107, 15 parts by weight produced by Adeka Corporation)

Sulfur (Colloidal Sulfur A, 1.2 parts by weight produced by Tsurumi Chemical Industry Co., Ltd.)

Vulcanization accelerator 2.5 parts by weight (N-cyclohexyl-2-benzothiazylsulfenamide;
  Nocceler CZ-P, produced by Ouchi Shinko Chemical Industrial Co., Ltd.)

Vulcanization accelerator (tetramethylthiuram disulfide; 2.0 parts by weight Sanceler TT-G, produced by Sanshin Chemical Industry Co., Ltd.)

Stearic acid (produced by Miyoshi Oil & Fat Co., Ltd.) 0.2 part by weight Microcrystalline wax (Suntight R, 0.5 part by weight produced by Seiko Chemical Co., Ltd.,
  melting start temperature: 65° C.)

Each of the above components was kneaded with a kneader and an open roll in sequence, and the kneaded product (composition) was subjected to primary vulcanization at 180° C. for 4 minutes and oven vulcanization (secondary vulcanization) at 150° C. for 1 hour.

The obtained vulcanizate was measured and evaluated for the following various items.

Hardness: according to JIS K6253 corresponding to ISO 18517
  Three rubber sheets with a thickness of 2 mm were stacked, and the durometer hardness A was measured.

Tensile test: according to JIS K6251 corresponding to ISO 37
  A rubber sheet with a thickness of 2 mm was punched into the shape of a JIS 5 dumbbell specimen using a punching jig, and three of the resulting specimens were measured for tensile strength and elongation at break.

Compression set test: according to JIS K6262 corresponding to ISO 815-1
  Three block specimens with a diameter of 29.0±0.5 mm and a thickness of 12.5±0.5 mm were tested at 120° C. for 72 hours at a compression rate of 25%.

Ozone degradation test: according to JIS K6259 corresponding to ISO 1431
  Using a punching jig, a rubber sheet with a thickness of 2 mm was punched into a strip shape having a smooth surface with a length (between grippers) of 40 mm or more, a width of about 10 mm and a thickness of 2.0±0.2 mm. Three of the resulting specimens were tested under conditions of 40° C., 72 hours, an ozone concentration of 50 pphm, and a rubber elongation rate of 20%, and evaluated by the method described in JIS K6259, Appendix JA.

(Method described in Appendix JA)
A-2: a few cracks (visible to the naked eye)
B-2: many cracks (visible to the naked eye)
C-2: innumerable cracks (visible to the naked eye)
C-3: innumerable cracks (deep cracks, relatively large, less than 1 mm)
C-4: innumerable cracks (deep cracks, large, 1 mm or more and less than 3 mm)

None: No cracks

Appearance at the time of molding: The surface condition of O-ring shaped
  specimens with a diameter of 3.1 mm was visually observed. Those with a good surface condition were evaluated as ◯, and those with appearance defects such as cloudiness and patterns were evaluated as X.

Example 2

In Example 1, the amount of microcrystalline wax was changed to 1.0 part by weight.

Example 3

In Example 1, the amount of stearic acid was changed to 0.3 parts by weight and the amount of microcrystalline wax was changed to 1.0 part by weight, respectively.

Example 4

In Example 1, the amount of stearic acid was changed to 0.5 parts by weight and the amount of microcrystalline wax was changed to 1.0 part by weight, respectively.

Example 5

In Example 3, the same amount (100 parts by weight) of NBR JSR N215SL (produced by JSR, bound AN content: 48%, Mooney viscosity $ML_{1+4}(100°\ C.)$: 45) was used in place of NBR DN101L.

Example 6

In Example 3, the same amount (100 parts by weight) of NBR JSR N230S (produced by JSR, bound AN content: 35%, Mooney viscosity $ML_{1+4}(100°\ C.)$: 56) was used in place of NBR DN101L.

Example 7

In Example 3, the same amount (100 parts by weight) of NBR JSR N240S (produced by JSR, bound AN content: 28%, Mooney viscosity $ML_{1+4}(100°\ C.)$: 56) was used in place of NBR DN101L.

Example 8

In Example 3, the same amount (100 parts by weight) of NBR JSR N250S (produced by JSR, bound AN content: 19.5%, Mooney viscosity $ML_{1+4}(100°\ C.)$: 63) was used in place of NBR DN101L.

Comparative Example 1

In Example 1, neither stearic acid nor microcrystalline wax was used.

Comparative Example 2

In Example 1, stearic acid was not used.

Comparative Example 3

In Example 2, stearic acid was not used.

Comparative Example 4

In Example 2, stearic acid was not used, and the amount of microcrystalline wax was changed to 2 parts by weight.

Comparative Example 5

In Example 1, microcrystalline wax was not used.

Comparative Example 6

In Example 3, microcrystalline wax was not used.

Comparative Example 7

In Example 3, the amount of microcrystalline wax was changed to 0.5 parts by weight.

Comparative Example 8

In Example 3, the amount of microcrystalline wax was changed to 2.0 parts by weight.

Comparative Example 9

In Example 4, microcrystalline wax was not used.

Comparative Example 10

In Example 4, the amount of microcrystalline wax was changed to 0.5 parts by weight.

Comparative Example 11

In Example 1, the amount of stearic acid was changed to 1.0 part by weight, and microcrystalline wax was not used.

Comparative Example 12

In Example 1, the amount of stearic acid was changed to 1.0 part by weight.

Comparative Example 13

In Example 2, the amount of stearic acid was changed to 1.0 part by weight.

Comparative Example 14

In Example 1, the amount of stearic acid was changed to 1.0 part by weight and the amount of microcrystalline wax was changed to 2.0 parts by weight, respectively.

Comparative Example 15

In Example 3, the same amount (1 part by weight) of Suntight produced by Seiko Chemical Co., Ltd., (melting start temperature: 75° C.) was used as the paraffin wax.

Comparative Example 16

In Example 3, the same amount (1 part by weight) of Suntight S produced by Seiko Chemical Co., Ltd., (melting start temperature: 60° C.) was used as the paraffin wax.

Comparative Example 17

In Example 3, the same amount (1 part by weight) of Suntight SW produced by Seiko Chemical Co., Ltd., (melting start temperature: 100° C.) was used as the paraffin wax.

The results obtained in the above Examples and Comparative Examples are shown in the following Table 2. Table 1 shows the compounding amounts of stearic acid and microcrystalline wax (Suntight R) used in Examples 1 to 4 and Comparative Examples 1 to 14, in which DN101L was used as NBR.

TABLE 1

| Example | Stearic acid (part by weight) | Suntight R (part by weight) |
|---|---|---|
| Example 1 | 0.2 | 0.5 |
| Example 2 | 0.2 | 1.0 |
| Example 3 | 0.3 | 1.0 |
| Example 4 | 0.5 | 1.0 |
| Comparative Example 1 | — | — |
| Comparative Example 2 | — | 0.5 |
| Comparative Example 3 | — | 1.0 |
| Comparative Example 4 | — | 2.0 |
| Comparative Example 5 | 0.2 | — |
| Comparative Example 6 | 0.3 | — |
| Comparative Example 7 | 0.3 | 0.5 |
| Comparative Example 8 | 0.3 | 2.0 |
| Comparative Example 9 | 0.5 | — |
| Comparative Example 10 | 0.5 | 0.5 |
| Comparative Example 11 | 1.0 | — |
| Comparative Example 12 | 1.0 | 0.5 |
| Comparative Example 13 | 1.0 | 1.0 |
| Comparative Example 14 | 1.0 | 2.0 |

TABLE 2

| Example | Hardness | Tensile strength (MPa) | Elongation at break (%) | Compression set (%) | Ozone degradation: Presence or absence of crack | Appearance at the time of molding |
|---|---|---|---|---|---|---|
| Example 1 | 59 | 11.9 | 390 | 25 | None | ○ |
| Example 2 | 59 | 12.7 | 420 | 26 | None | ○ |
| Example 3 | 60 | 13.4 | 420 | 27 | None | ○ |
| Example 4 | 60 | 11.1 | 400 | 26 | None | ○ |
| Example 5 | 67 | 12.5 | 420 | 28 | None | ○ |
| Example 6 | 67 | 10.5 | 400 | 25 | None | ○ |
| Example 7 | 62 | 7.1 | 240 | 23 | None | ○ |
| Example 8 | 60 | 6.3 | 230 | 24 | None | ○ |
| Comparative Example 1 | 60 | 14.5 | 430 | 35 | C-3 | ○ |
| Comparative Example 2 | 60 | 14.4 | 430 | 35 | None | ○ |
| Comparative Example 3 | 59 | 13.3 | 410 | 36 | None | ○ |
| Comparative Example 4 | 59 | 13.3 | 410 | 36 | None | x |
| Comparative Example 5 | 59 | 11.9 | 420 | 24 | C-4 | ○ |
| Comparative Example 6 | 60 | 13.0 | 430 | 24 | C-4 | ○ |
| Comparative Example 7 | 61 | 11.9 | 370 | 25 | A-2 | ○ |
| Comparative Example 8 | 60 | 9.5 | 360 | 26 | None | x |
| Comparative Example 9 | 61 | 12.6 | 420 | 24 | C-4 | ○ |
| Comparative Example 10 | 60 | 12.0 | 410 | 26 | B-2 | ○ |
| Comparative Example 11 | 60 | 14.2 | 410 | 27 | C-4 | ○ |
| Comparative Example 12 | 61 | 10.8 | 360 | 25 | C-2 | ○ |
| Comparative Example 13 | 61 | 10.2 | 360 | 25 | C-2 | ○ |
| Comparative Example 14 | 61 | 11.4 | 340 | 25 | None | x |
| Comparative Example 15 | 60 | 14.9 | 440 | 28 | C-2 | ○ |
| Comparative Example 16 | 60 | 15.6 | 410 | 28 | A-2 | ○ |
| Comparative Example 17 | 60 | 13.6 | 420 | 29 | C-2 | ○ |

The above results demonstrate the following.

(1) The product of each Example satisfies all of the moldability, vulcanizate physical properties, compression set characteristics, and ozone resistance, and is not affected by the AN content of NBR.

(2) When stearic acid is not used, not only the vulcanization speed is delayed and the compression set characteristics are deteriorated, but also the ozone resistance and the appearance at the time of molding may be deteriorated. (Comparative Examples 1 to 4).

(3) When paraffin wax having a melting start temperature other than 65° C. is used, the ozone resistance is insufficient (Comparative Examples 15 to 17).

(4) When paraffin wax is not used, the ozone resistance is insufficient (Comparative Examples 5, 6, 9 and 11).

(5) Even when paraffin wax having a melting start temperature of 65° C. is used, if the amount thereof is less than an amount equal to twice the amount of stearic acid, the ozone resistance is insufficient (Comparative Examples 7, 10, 12 and 13).

(6) When paraffin wax is compounded in an amount exceeding 6 times the amount of stearic acid, the appearance at the time of molding is deteriorated (Comparative Example 8).

(7) When the components are used at the ratio described in Patent Document 1, the appearance at the time of molding is impaired (Comparative Example 14).

The invention claimed is:

1. An NBR composition comprising, based on 100 parts by weight of NBR, 0.2 to 0.3 parts by weight of stearic acid, and microcrystalline wax, which has the melting start temperature of 65° C., in an amount equal to 2 to 6 times the amount of the stearic acid, and
the NBR composition further comprises zinc oxide, and
wherein the NBR composition has a bound acrylonitrile content of at least 35%.

2. The NBR composition according to claim 1, wherein a UV resistant antioxidant is further added.

3. The NBR composition according to claim 1, wherein a sulfur-based vulcanizing agent is further added.

4. The NBR composition according to claim 1, wherein the bound acrylonitrile content has an upper limit of 48%.

* * * * *